United States Patent
Jäger et al.

(10) Patent No.: US 10,234,846 B2
(45) Date of Patent: Mar. 19, 2019

(54) METHOD AND APPARATUS FOR DETERMINING AN OPTIMUM MANUFACTURING ALTERNATIVE FOR MANUFACTURING A PRODUCT

(71) Applicant: Siemens Aktiengesellschaft, München (DE)

(72) Inventors: Tobias Jäger, Baiersdorf Igelsdorf (DE); Rupert Maier, Eggolsheim (DE)

(73) Assignee: Siemens Aktiengesellschaft (DE)

( * ) Notice: Subject to any disclaimer, the term of this patent is extended or adjusted under 35 U.S.C. 154(b) by 41 days.

(21) Appl. No.: 15/322,520

(22) PCT Filed: Jul. 7, 2014

(86) PCT No.: PCT/EP2014/064459
§ 371 (c)(1),
(2) Date: Dec. 28, 2016

(87) PCT Pub. No.: WO2016/004972
PCT Pub. Date: Jan. 14, 2016

(65) Prior Publication Data
US 2017/0153627 A1    Jun. 1, 2017

(51) Int. Cl.
*G05B 19/4097* (2006.01)
*G06Q 50/04* (2012.01)
(Continued)

(52) U.S. Cl.
CPC ......... *G05B 19/4097* (2013.01); *G06N 5/022* (2013.01); *G06Q 10/067* (2013.01);
(Continued)

(58) Field of Classification Search
CPC ...... G05B 19/4097; G05B 2219/32153; G06N 5/022; G06Q 10/067; G06Q 50/04
See application file for complete search history.

(56) References Cited

U.S. PATENT DOCUMENTS 5,345,391 A * 9/1994 Hull .................. B29C 64/40
156/273.3
5,506,950 A * 4/1996 Hughes ............... G06F 17/509
345/420

(Continued)

FOREIGN PATENT DOCUMENTS

DE      100 23 668 A1    12/2001
EP      2 019 371 A1     1/2009

OTHER PUBLICATIONS

International Search Report for PCT Application No. PCT/EP2014/064459, dated Sep. 24, 2014.

*Primary Examiner* — Ramesh B Patel
(74) *Attorney, Agent, or Firm* — Schmeiser, Olsen & Watts LLP.

(57) ABSTRACT

A method and device for determining an optimum manufacturing variant for manufacturing a product from currently available manufacturing alternatives of one or more manufacturing plants, and for creating the associated manufacturing documents based on the following steps: creating a product-specific, manufacturing plant-independent CAD manufacturing specification of the product to be manufactured; determining different possible manufacturing alternatives for manufacturing the product based on the created product-specific, manufacturing plant independent CAD-manufacturing specification and the available manufacturing machines; generating a specific CAD-model for each determined manufacturing alternative, wherein a feedback report is created by an associated CAM-engine for each generated specific CAD-model; evaluating the created feedback reports of the different manufacturing alternatives in order to determine the manufacturing alternatives that are suitable for manufacturing the product and to evaluate whether each manufacturing alternative complies with predefined manu- (Continued)

facturing tolerances and manufacturing specifications; and selecting the optimum manufacturing alternative.

13 Claims, 2 Drawing Sheets

(51) Int. Cl.
*G06N 5/02* (2006.01)
*G06Q 10/06* (2012.01)

(52) U.S. Cl.
CPC ......... *G06Q 10/0631* (2013.01); *G06Q 50/04* (2013.01); *G05B 2219/32153* (2013.01); *Y02P 90/30* (2015.11); *Y02P 90/86* (2015.11)

(56) References Cited

U.S. PATENT DOCUMENTS

| | | | | |
|---|---|---|---|---|
| 5,552,995 A * | 9/1996 | Sebastian | ............ | B29C 33/3835 700/182 |
| 5,587,912 A * | 12/1996 | Andersson | ......... | A61C 13/0004 700/98 |
| 5,717,598 A * | 2/1998 | Miyakawa | ......... | G05B 19/4097 700/103 |
| 5,731,982 A * | 3/1998 | Namba | .............. | G05B 19/4099 700/117 |
| 5,844,801 A * | 12/1998 | Kodama | .............. | B62D 65/005 700/110 |
| 5,861,114 A * | 1/1999 | Roffman | ................ | B29C 33/306 264/1.1 |
| 5,995,097 A * | 11/1999 | Tokumine | ............... | G06F 17/50 707/999.201 |
| 6,144,008 A * | 11/2000 | Rabinovich | ............. | B22F 3/005 156/180 |
| 6,230,066 B1 * | 5/2001 | Sferro | ................ | G05B 19/4097 345/419 |
| 6,233,499 B1 * | 5/2001 | Matsumoto | ......... | B29C 33/3835 700/118 |
| 6,268,853 B1 * | 7/2001 | Hoskins | ................ | G05B 15/02 700/83 |
| 6,304,680 B1 * | 10/2001 | Blake | .................. | G06K 9/6203 345/648 |
| 6,393,331 B1 * | 5/2002 | Chetta | .................... | F01D 11/12 700/104 |
| 6,512,995 B2 * | 1/2003 | Murao | .................. | G06T 17/005 345/418 |
| 6,547,994 B1 * | 4/2003 | Monkhouse | .......... | B29C 64/165 264/113 |
| 6,580,959 B1 * | 6/2003 | Mazumder | ......... | G05B 19/4185 700/112 |
| 2004/0073404 A1 * | 4/2004 | Brooks | ................ | G05B 19/409 702/183 |

* cited by examiner

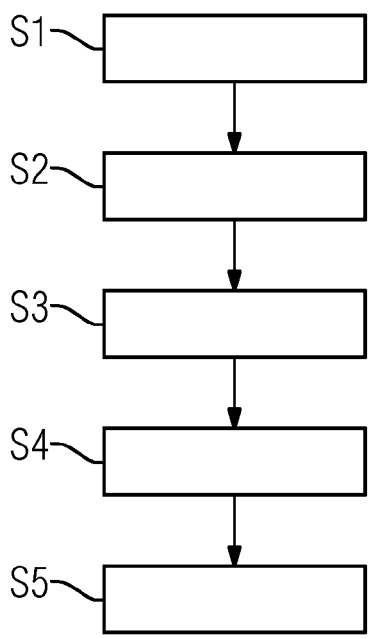
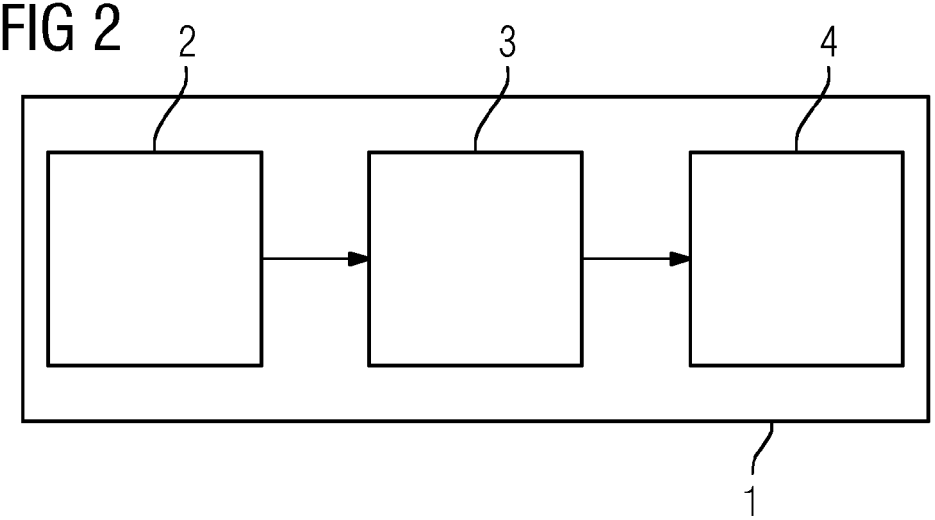

METHOD AND APPARATUS FOR DETERMINING AN OPTIMUM MANUFACTURING ALTERNATIVE FOR MANUFACTURING A PRODUCT

CROSS-REFERENCE TO RELATED APPLICATIONS

This application claims priority to PCT Application No. PCT/EP2014/064459, having a filing date of Jul. 7, 2014, the entire contents of which are hereby incorporated by reference.

FIELD OF TECHNOLOGY

The following relates to a method and an apparatus for determining an optimum manufacturing alternative for manufacturing a product and relates, in particular, to the optimization of a CAD/CAM interface by integrating a knowledge-based system.

BACKGROUND

Computer Integrated Manufacturing CIM comprises a wide variety of activities which are computer-assisted in a company and comprises, in particular, CAD, Computer Aided Design, and CAM, Computer Aided Manufacturing. Computer Aided Manufacturing CAM denotes the use of control software, which is independent of a CMT machine, to create a control code. Conventional CAD systems have the possibility of creating 3-D CAD data models of components, which data models form the basis for manufacturing these components. In order to expand the functionality, such programs usually have an interface which can be used to integrate further functionalities, so-called plug-ins. In order to be able to manufacture products, in particular components, in an automated manner as far as possible, the CAD system can already decide, during the creation of the CAD drawings, on the basis of which material and which manufacturing technology the affected product or component in the form of a 3-D drawing is intended to be manufactured.

However, in conventional systems, a flexibility problem exists to the effect that, at such an early time, that is to say during the creation of the CAD drawings, all information relating to the product or component to be manufactured is usually not yet available. Furthermore, manufacturing-relevant information, for example machine utilization of the manufacturing machines, a delivery location of the manufactured product or component, a current order situation for the manufacturing of the product or component and information relating to the machine and tool state, is not yet available at this early time and becomes available only later, in particular during manufacturing. Since, however, the optimum stipulation of the material used and of the manufacturing technology used is necessary for optimum manufacturing of a product or component, conventional CIM systems operate only in a suboptimal manner. In addition, a situational change to other materials or machines or manufacturing technologies during manufacturing is possible in conventional CIM systems only by redesigning the CAD drawings provided by the CAM system.

In addition to the above-mentioned flexibility problem, conventional CIM systems also have a quality problem since decisions to be made on the basis of the design and manufacturing of the product or component depend on a multiplicity of complex influencing factors which are dependent on one another. However, in conventional CIM systems, only experts trained in this have the associated knowledge and the corresponding information, which experts are not available on site in many cases. Therefore, many design decisions with regard to the product or component to be manufactured are made only in a suboptimal manner, in which case an optimum manufacturing variant or manufacturing alternative for manufacturing the product or component remains mostly disregarded, in particular.

SUMMARY

An aspect relates to providing a method and an apparatus which overcome the above-mentioned disadvantages of conventional systems and ensure, in particular, that a product or a component is flexibly manufactured with high quality.

Embodiments of the invention therefore provides a method for determining an optimum manufacturing variant for manufacturing a product from currently available manufacturing alternatives of one or more manufacturing plants and producing the associated manufacturing documents on the basis of the following steps: producing a product-specific, manufacturing plant-independent CAD manufacturing specification for the product to be manufactured; determining various possible manufacturing alternatives for manufacturing the product on the basis of the produced product-specific, manufacturing plant-independent CAD manufacturing specification and the available manufacturing machines; generating an enhancement of a CAD model for each manufacturing alternative determined, an associated CAM engine producing a feedback report for each generated enhancement of the CAD model; evaluating the produced feedback reports of the various manufacturing alternatives for the purpose of determining manufacturing alternatives suitable for manufacturing the product and evaluating whether predefined manufacturing tolerances and manufacturing specifications are complied with in the respective manufacturing alternative; and
selecting the optimum manufacturing alternative from the determined suitable manufacturing alternatives on the basis of a current manufacturing situation.

In one possible embodiment of the method according to the invention, the CAM engine determines, for the generated specific enhancement of the CAD model of the respective manufacturing alternative, the manufacturing steps needed to manufacture the product and produces a corresponding control program for this manufacturing alternative.

In another possible embodiment of the method according to the invention, the manufacturing machines of the manufacturing plant are controlled by the produced control program for the selected optimum manufacturing alternative.

In another possible embodiment of the method according to the invention, the optimum manufacturing alternative is selected by taking into account different criteria, in particular capabilities of the respectively involved manufacturing machines, which can be read from a CAD/CAM database, expected product properties, in particular constituents, disposability or wear etc., and/or surface properties, shape of the geometry, in particular on active and functional surfaces, and the resulting effort, in particular the effort needed for production, provision of materials and transport etc., and the current plant status of the manufacturing plant.

In one possible embodiment of the method according to the invention, the plant status of the manufacturing plant indicates, in particular:
utilization and/or throughput of the manufacturing machines of the manufacturing plant and of the associated manufacturing employees, availability of the manufacturing machines of the manufacturing plant, in particular a servicing plan for servicing and maintaining the manufacturing machines of the manufacturing plant, manufacturing effort needed to manufacture the product by means of the manufacturing machines of the manufacturing plant, and/or availability of resources, raw materials and raw parts for manufacturing the product by means of the manufacturing machines of the manufacturing plant and/or other degrees of freedom involved in manufacturing the product by means of the manufacturing plant.

In another possible embodiment of the method according to the invention, the component-specific CAD manufacturing specification for the product to be manufactured is produced by a CAD system and contains a 3-D CAD model of the product to be manufactured.

In another possible embodiment of the method according to the invention, the component-specific CAD manufacturing specification has further manufacturing requirements, in particular physical and/or chemical properties of the product to be manufactured which need to be complied with and manufacturing tolerances.

In another possible embodiment of the method according to the invention, the produced feedback reports of the various manufacturing alternatives are collected and an overall feedback report is produced on the basis thereof and on the basis of the previous product-specific CAD manufacturing specification for the product and on the basis of data and/or rules read from a CAD/CAM database, which overall feedback report is evaluated by the CAD system in order to adapt the product-specific CAD manufacturing specification.

In another possible embodiment of the method according to the invention, a specific CAD model is generated by a CAD model generator for each identified manufacturing alternative on the basis of data and/or rules read from a CAD/CAM database.

In another possible embodiment of the method according to the invention, a measuring and testing plan for monitoring a product quality of the manufactured product is generated on the basis of the specific CAD model generated by the CAD model generator and on the basis of data and/or rules, in particular with regard to available tests and measurement methods of the various manufacturing alternatives, which are read from the CAD/CAM database, which measuring and testing plan is transmitted to measuring and testing devices of the manufacturing plant.

According to a second aspect, embodiments of the invention also provides an apparatus for providing an optimum manufacturing alternative for manufacturing a product, in particular a component.

having an apparatus for providing an optimum manufacturing variant for manufacturing a product from currently available manufacturing alternatives of one or more manufacturing plants, having: a CAD system for producing a product-specific, manufacturing plant-independent CAD manufacturing specification for the product to be manufactured, a CAD model generator which determines various possible manufacturing alternatives for manufacturing the product on the basis of the product-specific, manufacturing plant-independent CAD manufacturing specification produced by the CAD system, an enhancement of the CAD model being generated for each determined manufacturing alternative and being tested by an associated CAM engine for the purpose of producing a feedback report, and having an evaluation unit which evaluates the produced feedback reports of the various manufacturing alternatives for the purpose of determining manufacturing alternatives suitable for manufacturing the product and selects the optimum manufacturing alternative from the determined suitable manufacturing alternatives on the basis of all available specifications and influencing variables.

The embodiments of the invention therefore provide an apparatus for providing an optimum manufacturing alternative for manufacturing a product, in particular a component, having: a CAD system for producing a product-specific, manufacturing plant-independent CAD manufacturing specification for the product to be manufactured, a CAD model generator which determines various possible manufacturing alternatives for manufacturing the product on the basis of the product-specific, manufacturing plant-independent CAD manufacturing specification produced by the CAD system, a specific enhancement of the CAD model being generated for each determined manufacturing alternative and being tested by an associated CAM engine for the purpose of producing a feedback report, and having an evaluation unit which evaluates the produced feedback reports of the various manufacturing alternatives for the purpose of determining manufacturing alternatives suitable for manufacturing the product and selects the optimum manufacturing alternative from the determined suitable manufacturing alternatives on the basis of all available specifications and influencing variables.

The enhancement of the CAD model for a manufacturing alternative corresponds to the respective manufacturing technology and/or to the respective manufacturing plant and/or to the respective manufacturing method of the manufacturing alternative.

In one possible embodiment of the apparatus according to the invention, each CAM engine produces a control program for the respectively associated enhancement of the CAD model, which is generated by the CAD model generator for the corresponding manufacturing alternative, which control program controls manufacturing machines of the manufacturing plant for manufacturing the product.

In another possible embodiment of the apparatus according to the invention, the evaluation unit has access to a database which stores knowledge and rules relating to material properties as well as CAD and CAM data with regard to manufacturing processes and/or manufacturing steps and/or manufacturing rules.

In another possible embodiment of the apparatus according to the invention, the evaluation unit selects the optimum manufacturing alternative on the basis of product characteristic variables and a current manufacturing situation of the manufacturing plant.

In this case, a current plant status of the manufacturing plant is preferably taken into account, which status includes, in particular:
utilization and/or throughput of the manufacturing machines of the manufacturing plant and of the associated manufacturing employees, availability of the manufacturing machines of the manufacturing plant, in particular a servicing plan for servicing and maintaining the manufacturing machines of the manufacturing plant, manufacturing effort needed to manufacture the product by means of the manufacturing machines of the manufacturing plant, and availability of resources, raw materials and raw parts for manufacturing the product by means of the manufacturing machines of the manufacturing plant and/or other degrees of freedom of the manufacturing machines of the manufacturing plant.

In another possible embodiment of the apparatus according to the invention, the produced feedback reports of the various manufacturing alternatives are collected and an overall feedback report is produced on the basis thereof and on the basis of the previous product-specific CAD manufacturing specification for the product and on the basis of data and rules read from a CAD/CAM database, which overall feedback report is evaluated by the CAD system in order to adapt the product-specific CAD manufacturing specification.

According to a third aspect, embodiments of the invention also provides a manufacturing plant having manufacturing machines for manufacturing at least one product, in particular a component.

Embodiments of the invention therefore provide a manufacturing plant having manufacturing machines for manufacturing at least one product, in particular a component, having an apparatus for providing an optimum manufacturing variant for manufacturing a product from currently available manufacturing alternatives, having a CAD system for producing a product-specific, manufacturing plant-independent CAD manufacturing specification for the product to be manufactured, a CAD model generator which determines various possible manufacturing alternatives for manufacturing the product on the basis of the product-specific, manufacturing plant-independent CAD manufacturing specification produced by the CAD system, an enhancement of a CAD model being generated for each determined manufacturing alternative and being tested by an associated CAM engine for the purpose of producing a feedback report, and having an evaluation unit which evaluates the produced feedback reports of the various manufacturing alternatives for the purpose of determining manufacturing alternatives suitable for manufacturing the product and selects the optimum manufacturing alternative from the determined suitable manufacturing alternatives on the basis of all available specifications and influencing variables.

In one possible embodiment of the manufacturing plant according to the invention, a CAM engine generates a control program for the respectively associated enhancement of the CAD model, which is generated by the CAD model generator of the apparatus for the corresponding manufacturing alternative, which control program controls manufacturing machines of the manufacturing plant for manufacturing the product.

In one possible embodiment of the manufacturing plant according to the invention, the evaluation unit of the apparatus has access to a database which stores knowledge and rules relating to material properties as well as CAD and CAM data with regard to manufacturing processes and/or manufacturing steps and/or manufacturing rules.

In another possible embodiment of the manufacturing plant according to the invention, the evaluation unit of the apparatus selects the optimum manufacturing alternative on the basis of product characteristic variables and a current manufacturing situation of the manufacturing plant, a current plant status of the manufacturing plant preferably being taken into account, which status includes, in particular:

utilization and/or throughput of the manufacturing machines of the manufacturing plant and of the associated manufacturing employees, availability of the manufacturing machines of the manufacturing plant, in particular a servicing plan for servicing and maintaining the manufacturing machines of the manufacturing plant, manufacturing effort needed to manufacture the product by means of the manufacturing machines of the manufacturing plant, and availability of resources, raw materials and raw parts for manufacturing the product by means of the manufacturing machines of the manufacturing plant and/or other degrees of freedom of the manufacturing machines of the manufacturing plant.

In another possible embodiment of the manufacturing plant according to the invention, the produced feedback reports of the various manufacturing alternatives are collected and an overall feedback report is produced on the basis thereof and on the basis of the previous product-specific, manufacturing plant-independent CAD manufacturing specification for the product and on the basis of data and rules read from a CAD/CAM database, which overall feedback report is evaluated by the CAD system in order to adapt the product-specific, manufacturing plant-independent CAD manufacturing specification.

BRIEF DESCRIPTION

Some of the embodiments will be described in detail, with reference to the following figures, wherein like designations denote like members, wherein:

FIG. 1 shows a flowchart for illustrating an exemplary embodiment of a method;

FIG. 2 shows a block diagram for illustrating an exemplary embodiment of an apparatus for providing an optimum manufacturing alternative.

DETAILED DESCRIPTION

Figure 3:
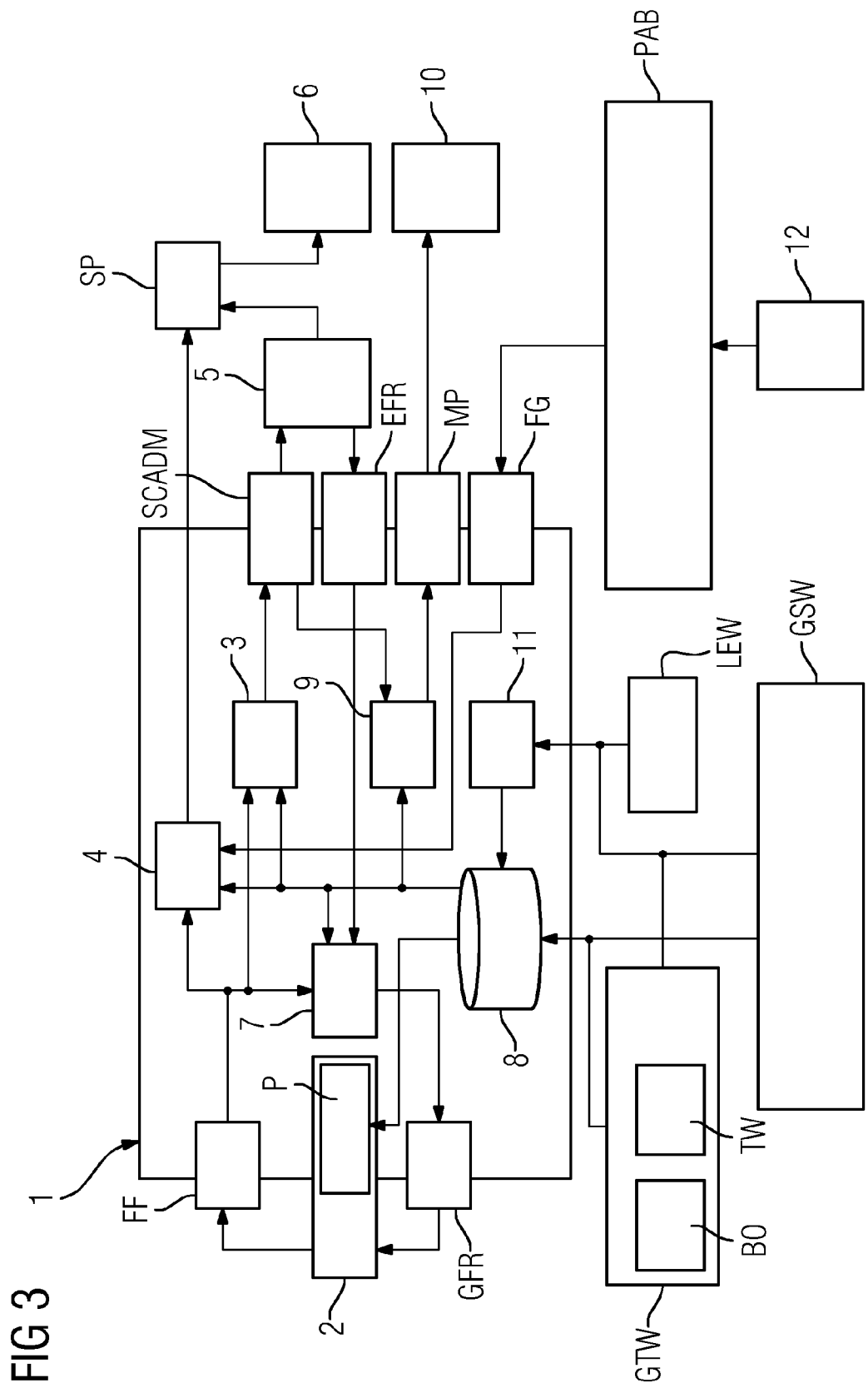
FIG. 3 shows a detailed sketch for explaining the method of operation of the apparatus for determining an optimum manufacturing variant for manufacturing a product.

As can be seen in FIG. 1, the method according to the embodiments of the invention for determining an optimum manufacturing variant for manufacturing a product from currently available manufacturing alternatives of one or more manufacturing plants has a plurality of steps in order to provide the associated manufacturing documents.

In the exemplary embodiment illustrated, a product-specific, manufacturing plant-independent CAD manufacturing specification for the product or component to be manufactured is first of all produced in a step S1. This CAD manufacturing specification or CAD recipe is preferably generated using a CAD system. In one possible embodiment, the product-specific, manufacturing plant-independent CAD manufacturing specification has a CAD data model of the product to be manufactured. The CAD data model indicates important relevant core properties of the product to be manufactured which must not be contravened by the manufacturing technology used. The CAD data model is preferably a 3-D CAD data model. In this case, the CAD data model preferably already does not have specific manufacturing instructions, as in conventional systems, but rather instead comprises suggestions of which manufacturing alternatives for manufacturing the product are possible or available and which manufacturing specifications and manufacturing tolerances should be complied with in this case.

In a further step S2, various possible manufacturing alternatives for manufacturing the product are determined on the basis of the produced product-specific, manufacturing plant-independent CAD manufacturing specification and the available manufacturing machines for the respective manufacturing plant. The component-specific or product-specific, manufacturing plant-independent CAD manufacturing specification used in this case may have further manufacturing requirements, in particular physical and/or chemical properties of the product to be manufactured which must be complied with and permissible manufacturing tolerances.

In a further step S3, an enhancement of the CAD model is generated for each manufacturing alternative determined. A feedback report is produced for each generated enhancement of the CAD model by an associated CAM engine. Depending on the format of the CAD data models and depending on the type and make of the manufacturing machine respectively used in the manufacturing plant, specific suitable CAM engines are used to produce control programs used to manufacture the particular component or product. These CAM engines also make it possible to carry out a plausibility check and provide a corresponding feedback report in this case. Core properties can be adapted in a feedback loop, with the result that a final CAD model containing feedback obtained from the CAM engine is produced from the original CAD model.

In a further step S4, the produced feedback reports of the various manufacturing alternatives are evaluated for the purpose of determining manufacturing alternatives suitable for manufacturing the product, in which case it is taken into account whether predefined manufacturing tolerances and manufacturing specifications are complied with for the respective manufacturing alternative.

In a further step S5, the optimum manufacturing alternative is selected from the determined suitable manufacturing alternatives on the basis of a current manufacturing situation. The selection relates to the adaptation of the design, in which case the greatest possible number of different manufacturing plants and/or manufacturing technologies owned by the manufacturer can be used. In this case, the optimum manufacturing alternative is preferably selected taking into account different criteria, in particular capabilities of the respective manufacturing machines involved, which are read from a CAD/CAM database for example, expected product properties of the product, in particular constituents, disposability and wear, the resulting manufacturing effort, in particular the effort needed for production, supply of materials and transport, and a current plant status of the manufacturing plant affected. This plant status has, in particular, the following information, namely utilization and/or throughput of the manufacturing machines of the manufacturing plant and of the associated manufacturing employees, availability of the manufacturing machines of the manufacturing plant, in particular a servicing plan for servicing and maintaining the manufacturing machines of the manufacturing plant, manufacturing effort needed to manufacture the product by means of the manufacturing machines of the manufacturing plant, and availability of resources, raw materials and raw parts for manufacturing the product by means of the manufacturing machines of the manufacturing plant affected and/or other degrees of freedom involved in manufacturing the product by means of the manufacturing plant. In this case, the method according to the embodiments of the invention uses suitable interfaces in order to pick up relevant data, that is to say the current status of the currently affected manufacturing plants and correlated planning, and to take said data into account during the selection.

The component-specific, manufacturing plant-independent CAD manufacturing specification for the product to be manufactured, which was produced in step S1, is preferably produced by a CAD system and contains a 3-D CAD model of the product to be manufactured. In this case, the component-specific, manufacturing plant-independent CAD manufacturing specification preferably has further manufacturing requirements, in particular physical and/or chemical properties of the product to be manufactured which must be complied with and manufacturing tolerances which must be complied with.

After the various possible manufacturing alternatives for manufacturing the product have been determined on the basis of the CAD manufacturing specification in step S2, a specific enhancement of the CAD model is generated for each determined manufacturing alternative in step S3, this preferably being generated by a CAD model generator on the basis of data and/or rules read from a CAD/CAM database. A measuring and testing plan for monitoring a product quality of the manufactured product is preferably generated on the basis of the specific enhancement of the CAD model generated by the CAD model generator or on the basis of data and/or rules, in particular with regard to available tests and measurement methods of the various manufacturing alternatives read from the CAD/CAM database, which measuring and testing plan is transmitted to measuring and testing devices of the manufacturing plant.

An associated CAM engine produces a feedback report for each generated specific enhancement of the CAD model in step S3. The produced feedback reports of the various manufacturing alternatives are preferably collected and an overall feedback report is produced on the basis thereof and on the basis of the previous product-specific, manufacturing plant-independent CAD manufacturing specification for the product and on the basis of data and/or rules read from a CAD/CAM database, which overall feedback report is evaluated by the CAD system in order to adapt the product-specific, manufacturing plant-independent CAD manufacturing specification.

FIG. 2 shows a block diagram for illustrating a possible exemplary embodiment of the apparatus according to the invention for determining an optimum manufacturing variant and for manufacturing a product according to a further aspect of the embodiments of the invention.

As can be seen in FIG. 2, the apparatus 1 according to the invention has, in the exemplary embodiment illustrated, a CAD system 2 which produces or generates a product-specific, manufacturing plant-independent CAD manufacturing specification for the product to be manufactured.

The apparatus 1 also contains a CAD model generator 3 which determines various possible manufacturing alternatives for manufacturing the product on the basis of the product-specific CAD manufacturing specification produced by the CAD system 2. In this case, a specific enhancement of the CAD model is generated for each determined manufacturing alternative and is tested by an associated CAM engine in order to produce a feedback report.

The apparatus 1 also contains an evaluation unit 4 which evaluates the produced feedback reports of the various manufacturing alternatives for the purpose of determining manufacturing alternatives suitable for manufacturing the product and then selects the optimum manufacturing alternative from the determined suitable manufacturing alternatives on the basis of available specifications and influencing variables.

Each CAM engine preferably generates a control program for the respectively associated specific enhancement of the CAD model, which is generated by the CAD model generator 3 for the corresponding manufacturing alternative, which control program controls manufacturing machines of the manufacturing plant for manufacturing the product.

The evaluation unit 4 of the apparatus 1 preferably has access to a database which stores knowledge and rules relating to material properties as well as CAD and CAM data with respect to manufacturing processes and/or manufacturing steps and/or manufacturing rules. The evaluation unit 4 preferably selects the optimum manufacturing alternative on the basis of product characteristic variables of the product and a current manufacturing situation of the manufacturing plant, a current plant status of the manufacturing plant being taken into account.

The apparatus 1 for providing an optimum manufacturing variant, as illustrated in FIG. 2, is integrated in a control apparatus of a manufacturing plant in one possible embodiment. In this case, the apparatus 1 according to the embodiments of the invention shown in FIG. 2 preferably provides a corresponding control program for the selected manufacturing alternative, the manufacturing machines of the manufacturing plant being controlled by the control program provided for the selected optimum manufacturing alternative.

According to a further aspect, the embodiments of the invention provide a manufacturing plant having a plurality of manufacturing machines for manufacturing a product, the manufacturing machines of the manufacturing plant being controlled by control programs which are controlled by one or more control apparatuses respectively included in an apparatus for determining an optimum manufacturing variant for manufacturing a product, as illustrated in FIG. 2. The manufacturing machines can carry out various manufacturing steps of a manufacturing process. A plurality of manufacturing machines of the same type or design or of different types or designs may also be available for each manufacturing step.

FIG. 3 shows a sketch for explaining the method of operation of the method according to the embodiments of the invention and of the apparatus according to the embodiments of the invention. As can be seen in FIG. 3, the system illustrated there has an apparatus 1 for determining an optimum manufacturing variant for manufacturing a product, which apparatus contains, inter alia, a CAD system 2, a CAD model generator 3 and an evaluation unit 4. The CAD system 2 provides a product-specific, manufacturing plant-independent CAD manufacturing specification FF or a so-called manufacturing recipe for the product to be manufactured. Various possible manufacturing alternatives are determined on the basis of the produced product-specific, manufacturing plant-independent CAD manufacturing specification FF and the manufacturing machines available in the manufacturing plant. The CAD model generator 3 of the apparatus 1 then generates a specific enhancement of the CAD model for each manufacturing alternative determined. As illustrated in FIG. 3, the CAD model generator 3 generates a specific enhancement of the CAD model sCAD-M which is supplied to a specific CAM engine 5. The associated CAM engine 5 generates an individual feedback report EFR for each generated specific enhancement of the CAD model. After each individual specific enhancement of the CAD model has been transferred to the specific CAM engine 5, the CAM engine 5 preferably carries out a plausibility test, the result of the plausibility test being stored in the individual feedback report EFR. If no insurmountable technical obstacles have been identified in the plausibility test by the CAM engine 5, the specific CAM engine 5 determines the processing steps needed to manufacture the component or product on the basis of the received specific enhancement of the CAD model and generates the control programs SP required for this purpose for the respective specific manufacturing machines 6 of the manufacturing plant. Various types of manufacturing machines, for example turning machines, milling machines, bending machines or the like, and also various designs of manufacturing machines are generally available for manufacturing a product or a component, in particular a mechanical component. Depending on the required manufacturing accuracy or the material to be processed and the quantity to be manufactured, the various types and designs of these manufacturing machines are differently suited to carrying out the respective manufacturing steps. The manufacturing machines 6 of the manufacturing plant are controlled by the control program SP for the selected optimum manufacturing alternative. As illustrated in FIG. 3, the optimum manufacturing alternative is selected by an evaluation unit 4 of the apparatus 1 which can contain a situation-specific decision-making unit. On the basis of all manufacturing alternatives which have already been previously produced and a current plant status of the manufacturing plant, this subsystem identifies the respective optimum specific manufacturing machine 6 of the manufacturing plant for the individual manufacturing steps. According to this decision, the respectively associated control program SP is transferred to the corresponding manufacturing machine of the manufacturing plant and is executed there.

In the exemplary embodiment illustrated in FIG. 3, the individual feedback report EFR illustrated in FIG. 3 passes to a testing device 7 which may be integrated in the apparatus 1. The testing device 7 collects the individual feedback reports EFR from the specific CAM engine 5 and uses them to create an overall feedback report GFR on the basis of the specifications and the CAD manufacturing specification FF and the stored knowledge from a CAD/CAM knowledge database 8 as well as rules which have been read out. In one possible embodiment, the overall feedback report GFR is composed substantially of the individual feedback reports EFR and all specific CAD models sCAD-M. In one possible embodiment, this information is supplemented with knowledge on the basis of evaluations of the CAD manufacturing specification FF and taking into account the knowledge and rules stored in the CAD/CAM database 8. The overall feedback report is supplied to the CAD system 2 of the apparatus 1 for adaptation or correction. The CAD system 2 evaluates the received overall feedback report GFR in order to adapt the product-specific, manufacturing plant-independent CAD manufacturing specification FF.

In the exemplary embodiment illustrated in FIG. 3, the apparatus 1 also contains a measuring and testing plan generator 9.

This subsystem produces an associated measuring and testing plan MP from the respective specific enhancement of the CAD model sCAD-M with the aid of knowledge read from the CAD/CAM database 8. In the exemplary embodiment illustrated in FIG. 3, this measuring and testing plan MP is supplied to measuring equipment 10. The measuring equipment 10 monitors the product quality of the manufactured component or product, in particular in order to determine whether the manufacturing specifications and manufacturing tolerances required in the CAD models are complied with during the manufacturing of the product by the manufacturing machines of the manufacturing plant.

As illustrated in FIG. 3, in one possible embodiment, the CAD system 2 can use a situation-specific assistance system which can be integrated in the CAD system 2 is a plug-in P. The plug-in P implements a situation-specific assistance system which can provide situation-specific hints and suggestions on the basis of the current modeling steps and on the basis of the information stored in the database 8 and therefore supports the modeling work or modeling steps and avoids errors and identifies weaknesses in the design.

The CAD/CAM database 8 stores the knowledge base, the CAD/CAM data and various manufacturing rules. If the information is already presented on the basis of an existing technology, it can be used without further copying or restructuring. Data maintenance or information maintenance can be carried out in such a case by an independent third authority or entity. Otherwise, the corresponding knowledge or the corresponding information is included in the common knowledge base with the aid of a knowledge acquisition system 11. In this case, the knowledge acquisition system 11 can use local problem solutions, in particular in-house knowledge or local expert knowledge LEW, or can access globally available systemic knowledge GSW. This is, in particular, knowledge or information relating to various data formats, CAD model types, possibilities and limitations of individual manufacturing machines, test methods and tools. Furthermore, the knowledge acquisition system 11 of the apparatus 1 can access globally available technological knowledge GTW, in particular via a network interface, for example an Internet network interface. In addition to technical knowledge TW, the globally available technological knowledge GTW also comprises basic ontologies BO. In this case, technological knowledge or technological information relating to the properties and limitations of individual manufacturing materials and manufacturing processes can be used.

In one possible embodiment of the method according to the invention and of the apparatus 1 according embodiments of the invention, various degrees of freedom FG involved in the manufacturing are taken into account by the evaluation unit 4 when selecting the optimum manufacturing alternative. For this purpose, the apparatus 1 has an interface in order to pick up and take into account these data, in particular the plant status of the current manufacturing plants and the correlated manufacturing plans. For this purpose, it is also possible to use current planning, utilization and operating data PAB, as illustrated in FIG. 3. These data can be provided by existing project management systems. Using the current planning, utilization and operating data PAB ensures that the manufacturing machines of the manufacturing plant are used in an optimum manner taking into account currently prevailing boundary conditions with regard to the quality, the throughput and the required resources. The boundary conditions relate, for example, to possible limitations, utilization, disruptions or a currently existing order situation.

The system illustrated in FIG. 3 allows automated use of CAD/CAM information data in order to obtain situation-specific assistance with respect to the respectively pending design decisions with regard to a component or product. An optimum manufacturing method and the manufacturing machines suitable for this purpose are used on the basis of a current manufacturing task and the plant status and the current degrees of manufacturing freedom FG. The system according to the embodiments of the invention and the method according to the embodiments of the invention allow optimum manufacturing with regard to resource utilization, quality, logistics and customer satisfaction taking into account all existing current manufacturing parameters as far as possible. The method according to the embodiments of the invention and the apparatus according to the embodiments of the invention allow maximum exploitation of the degrees of manufacturing freedom FG, which are possible as a result of the existing machinery of the manufacturing plant, with regard to manufacturing flexibility as a result of early consideration in the design of the product to be manufactured. The system according to the embodiments of the invention allows the manufacturing data to be decoupled from the specifically available manufacturing machines of the manufacturing plant. In this case, weaknesses in the component design are avoided by means of automated assistance when making design decisions in the context of the manufacturing technology and the manufacturing materials with the aid of a situation-specific assistance system which is in the form of a plug-in P and can display hints and suggestions. The system can use standardized, manufacturer-independent, fully developed and established basic technologies. The method according to the embodiments of the invention and the system can be easily incorporated in existing tool landscapes and processes. The system according to the embodiments of the invention can also be generically expanded in a flexible manner, in particular with respect to existing knowledge, the manufacturing rules and possible exceptions. The system according to the invention is based on existing combinations of distributed knowledge bases, in particular knowledge with respect to material and semi-finished product properties, tool properties, apparatus information and resource stocks.

The invention claimed is:

1. A method for determining an optimum manufacturing variant for manufacturing a product from currently available manufacturing alternatives of one or more manufacturing plants and producing the associated manufacturing documents on the basis of the following steps:
   (a) producing a product-specific, manufacturing plant-independent CAD manufacturing specification for the product to be manufactured;
   (b) determining various possible manufacturing alternatives for manufacturing the product on the basis of the produced product-specific, manufacturing plant-independent CAD manufacturing specification and the available manufacturing machines;
   (c) generating an enhancement of the CAD model for each manufacturing alternative determined, an associated CAM engine producing a feedback report for each generated enhancement of the CAD model;
   (d) evaluating the produced feedback reports of the various manufacturing alternatives for the purpose of determining manufacturing alternatives suitable for manufacturing the product and evaluating whether predefined manufacturing tolerances and manufacturing specifications are complied with in the respective manufacturing alternative; and
   (e) selecting the optimum manufacturing alternative from the determined suitable manufacturing alternatives on the basis of a current manufacturing situation; and
   (f) producing a control program with the optimum manufacturing alternative, wherein the manufacturing machines of the manufacturing plant being controlled by the produced control program for the selected optimum manufacturing alternative.

2. The method as claimed in claim 1, wherein the CAM engine determining, for the generated specific enhancement of the CAD model of the respective manufacturing alternative, the manufacturing steps needed to manufacture the product and producing a corresponding control program for this manufacturing alternative.

3. The method as claimed in claim 1, wherein the optimum manufacturing alternative being selected by taking into account
   capabilities of the respectively involved manufacturing machines, which are read from a CAD/CAM database,
   expected product properties, in particular constituents, disposability and wear, and/or surface properties, shape of the geometry, in particular on active and functional surfaces, the resulting effort, in particular the effort needed for production, provision of materials and transport, and the current plant status of the manufacturing plant, the plant status indicating, in particular:
  utilization and/or throughput of the manufacturing machines of the manufacturing plant and of the associated manufacturing employees,
  availability of the manufacturing machines of the manufacturing plant, in particular a servicing plan for servicing and maintaining the manufacturing machines of the manufacturing plant,
  manufacturing effort needed to manufacture the product by means of the manufacturing machines of the manufacturing plant,
  availability of resources, raw materials and raw parts for manufacturing the product by means of the manufacturing machines of the manufacturing plant and/or other degrees of freedom involved in manufacturing the product by means of the manufacturing plant.

4. The method as claimed in claim 1, wherein the component-specific, manufacturing plant-independent CAD manufacturing specification for the product to be manufactured being produced by a CAD system and containing a 3-D CAD model of the product to be manufactured.

5. The method as claimed in claim 1, wherein the component-specific, manufacturing plant-independent CAD manufacturing specification having further manufacturing requirements, in particular physical and/or chemical properties of the product to be manufactured which need to be complied with and manufacturing tolerances.

6. The method as claimed in claim 1, wherein the produced feedback reports of the various manufacturing alternatives being collected and an overall feedback report being produced on the basis thereof and on the basis of the previous product-specific CAD manufacturing specification for the product and on the basis of data and/or rules read from a CAD/CAM database, which overall feedback report is evaluated by the CAD system in order to adapt the product-specific, manufacturing plant-independent CAD manufacturing specification.

7. The method as claimed in claim 1, wherein a specific enhancement of the CAD model being generated by a CAD model generator for each identified manufacturing alternative on the basis of data and/or rules read from a CAD/CAM database.

8. The method as claimed in claim 7, wherein a measuring and testing plan for monitoring a product quality of the manufactured product being generated on the basis of the specific enhancement of the CAD model generated by the CAD model generator and on the basis of data and/or rules, in particular with regard to available tests and measurement methods of the various manufacturing alternatives, which are read from the CAD/CAM database, which measuring and testing plan is transmitted to measuring and testing devices of the manufacturing plant.

9. An apparatus for providing an optimum manufacturing variant for manufacturing a product from currently available manufacturing alternatives of one or more manufacturing plants, having:
  a CAD system for producing a product-specific, manufacturing plant-independent CAD manufacturing specification for the product to be manufactured,
  a CAD model generator which determines various possible manufacturing alternatives for manufacturing the product on the basis of the product-specific, manufacturing plant-independent CAD manufacturing specification produced by the CAD system, an enhancement of the CAD model being generated for each determined manufacturing alternative and being tested by an associated CAM engine for the purpose of producing a feedback report, and having
  an evaluation unit which evaluates the produced feedback reports of the various manufacturing alternatives for the purpose of determining manufacturing alternatives suitable for manufacturing the product and selects the optimum manufacturing alternative from the determined suitable manufacturing alternatives on the basis of all available specifications and influencing variables, and
  wherein each CAM engine producing a control program for the respectively associated specific enhancement of the CAD model, which is generated by the CAD model generator for the corresponding manufacturing alternative, which control program controls manufacturing machines of the manufacturing plant for manufacturing the product.

10. The apparatus as claimed in claim 9, wherein the evaluation unit having access to a database which stores knowledge and rules relating to material properties as well as CAD and CAM data with regard to manufacturing processes and/or manufacturing steps and/or manufacturing rules.

11. The apparatus as claimed in claim 9, wherein the evaluation unit selecting the optimum manufacturing alternative on the basis of product characteristic variables and the current manufacturing situation of the manufacturing plant, a current plant status of the manufacturing plant being taken into account, which status includes:
  utilization and/or throughput of the manufacturing machines of the manufacturing plant and of the associated manufacturing employees,
  availability of the manufacturing machines of the manufacturing plant, in particular a servicing plan for servicing and maintaining the manufacturing machines of the manufacturing plant,
manufacturing effort needed to manufacture the product by means of the manufacturing machines of the manufacturing plant,
  availability of resources, raw materials and raw parts for manufacturing the product by means of the manufacturing machines of the manufacturing plant and/or other degrees of freedom of the manufacturing machines of the manufacturing plant.

12. The apparatus as claimed in claim 9, wherein the produced feedback reports of the various manufacturing alternatives being collected and an overall feedback report being produced on the basis thereof and on the basis of the previous product-specific CAD manufacturing specification for the product and on the basis of data and rules read from a CAD/CAM database, which overall feedback report is evaluated by the CAD system in order to adapt the product-specific CAD manufacturing specification.

13. A manufacturing plant having manufacturing machines for manufacturing at least one product, in particular a component, having an apparatus as claimed in claim 9.

* * * * *